Patented Aug. 12, 1941

2,252,486

UNITED STATES PATENT OFFICE 2,252,486

COATING COMPOSITION AND THE LIKE

Maurice H. Arveson, Flossmoor, Ill., assignor to Standard Oil Company, Chicago, Ill., a corporation of Indiana No Drawing. Application October 30, 1937, Serial No. 172,058

3 Claims. (Cl. 260—32)

This invention relates to coating compositions and particularly to coating compositions containing plasticized chlorinated high molecular weight synthetic hydrocarbon resins known as chlor viscoresins.

Certain unsaturated hydrocarbons, notably isobutylene, can be polymerized at low temperatures under the influence of catalysts such as boron trifluoride to produce high molecular weight synthetic hydrocarbon resins which are sometimes known as viscoresins. These viscoresins can be chlorinated to produce a different and in some respects more desirable type of resin. Particularly when a large proportion of chlorine is introduced into the viscoresin molecule, the chlorinated resin produced is very hard and brittle. In general this brittleness is a decided disadvantage when the resin is to be used in coating compositions and my invention overcomes this disadvantage while retaining the desirable properties of these chlorinated resins.

It is an object of my invention to provide new and improved coating compositions and other compositions of matter containing chlor viscoresins and particularly chlor viscoresins having a high chlorine content. Another object of my invention is to provide such compositions in which the desirable hardness of the chlor viscoresins and their desirable waterproofing and gloss producing properties are retained but in which the objectionable brittleness is overcome by the use of certain plasticizing agents. A more specific object of my invention is to provide such compositions in which the plasticizing agent is compatible with the chlor viscoresin and enhances its solubility in various solvents. A still further object of my invention is to provide coating compositions containing chlor viscoresins plasticized with materials which do not materially reduce the flame resistant characteristics of the chlor viscoresins themselves. Another object of my invention is to provide superior coating compositions and other compositions of matter containing chlor viscoresins, one or more additional chlorinated viscoresins and one or more plasticizing agents. Other and more detailed objects of my invention will become apparent as the description thereof proceeds.

In the manufacture of viscoresins liquefied olefinic hydrocarbons, and especially liquefied normally gaseous hydrocarbons, containing isoolefins, for example isobutylene, are subjected to the polymerizing action of metal halide catalysts, particularly aluminum chloride, boron chloride or boron fluoride, by which they are converted into high molecular weight plastic hydrocarbon resins. The molecular weight of these intermediate products may vary from 800 to 12,000 or higher and is affected considerably by the temperature at which the polymerization is conducted. It is preferred to employ temperatures below 30° F. and a temperature between —40° F. and —80° F. is desirable.

The chlor viscoresin is produced by subjecting the high molecular weight hydrocarbon resin made by the process of the preceding paragraph to the action of chlorine with or without the presence of a catalyst—usually in the presence of sunlight—and it is desirable to employ during the chlorination a suitable organic solvent such as carbon tetrachloride, ethylene dichloride, hexane, etc. Chlorinated organic solvents are preferred.

In many respects the highly chlorinated viscoresins, particularly those containing from about 45% to about 65% chlorine have many desirable properties.

For one thing the highly chlorinated viscoresins contain the chlorine in a more stable form than is the case with viscoresins chlorinated to a lesser degree. In other words, loss of chlorine through evolution of hydrogen chloride is less in the case of the more highly chlorinated viscoresins. Furthermore, the flame resistant properties of the chlor viscoresins increases with the chlorine content. More important, the ability of the chlor viscoresins to act as a waterproofing and gloss producing agent is increased by the high chlorine content.

With these advantages of a high degree of chlorination goes a disadvantage which makes the highly chlorinated viscoresins relatively unsuitable for use in coating compositions. This disadvantage lies in the fact that these highly chlorinated viscoresins are very brittle and lack toughness.

When a series of chlor viscoresins is prepared using different degrees of chlorination the more and more highly chlorinated viscoresins range from a highly viscous, tacky state characteristic of viscoresins and low chlorine content chlor viscoresins progressively towards a hard, brittle state characteristic of high chlorine content chlor viscoresins and at no stage is a chlor viscoresin produced which is tough. In other words, with more and more chlorination the chlor viscoresins produced begin to resist flow under pressure but acquire the property of brittleness without going through a relatively unbreakable, tough condition and the usability of these products in coating compositions is thus greatly impaired.

I have found that the highly chlorinated viscoresins, particularly those containing from about 45% to about 65% chlorine, can be rendered highly suitable for use in varnishes, paints or other coating compositions, for instance for coating paper, fabrics, Cellophane, leather, armature windings, insulated wire, metal, concrete, etc., by incorporating therein a compatible viscous chlorinated plasticizing agent.

A chlor viscoresin thus plasticized can be dissolved in a suitable solvent such as toluene, xylene, carbon tetrachloride, tetrachlorethylene or a mixture of any of these to give a coating composition which produces a film having very unusual luster, flexibility, resistance to chemicals and resistance to fire. Pigments, dyes and other color bodies can, of course, be added and fillers of various kinds can likewise be used.

As a plasticizing agent I prefer to use chlorinated diphenyls, commercial mixtures of which are known as Aroclors. For example, by adding small quantities of Aroclor to a chlor viscoresin of 30% to 60% chlorine content it can be dissolved in solvent mixtures containing commercial naphthas, whereas the chlor viscoresin itself is insoluble in commercial naphthas. Similarly, the amount of commercial naphtha that can be used in varnishes made from chlor viscoresins of higher chlorine content can be increased by the addition of very small amounts of Aroclors.

I prefer that the plasticizing agent constitute from about 2% to about 50% and more desirably from about 3% to about 20% by weight of the total amount of chlor viscoresin and chlorinated plasticizing agent. The mixture of chlor viscoresin and plasticizing agent can be dissolved in from one-half to five times its volume of organic solvent. In instances where available naphthas do not have sufficiently high solvent power for use alone, aromatic solvents such as toluol, benzol, xylol and their mixtures can be used alone or preferably with naphthas, or chlorinated solvents such as carbon tetrachloride, tetrachlorethylene, etc. can be substituted.

While the chlorinated diphenyls and their commercial mixtures known as Aroclors are preferred as plasticizing agents, I find that other plasticizing agents can be used, for instance the chlorinated naphthalenes and their commercial mixtures known as Halowaxes. These can be used in practically identically the same manner and amounts as the Aroclors. The chlorinated anthracenes, chlorinated diphenyl ethers and in fact the chlorinated polynuclear homocyclic compounds in general can be used as plasticizing agents in accordance with my invention. However, the chlorinated polynuclear homocyclic hydrocarbons are preferred.

The chlorine content of the plasticizing agent should be at least about 25% and preferably about 40% or more.

As an example of a coating composition in accordance with my invention, 90% of chlor viscoresin containing 50% chlorine can be incorporated with 10% of chlorinated plasticizing agent containing about 40% chlorine and this mixture can be applied in carbon tetrachloride solution as a coating composition. The chlorinated plasticizing agent is preferably mixed chlorinated diphenyls but may be composed of chlorinated naphthalenes, anthracenes, etc., as previously described.

The chlor viscoresin used in my new compositions can be made in a single chlorination step, as previously described, but I sometimes find it advantageous to use a mixture of two or three different chlor viscoresins of varying chlorine contents. Thus for instance, instead of using a chlor viscoresin chlorinated with 40% chlorine, a chlor viscoresin mixture of the same chlorine content but somewhat less hard and brittle can be made by blending a resin of 60% chlorine content and one of 10% chlorine content.

In addition to the chlor viscoresin and the plasticizing agent, my compositions can contain other resinous materials particularly chlor rubbers and vinyl chloride resins. Chlor rubber can be made either by reacting rubber with chlorine and by reacting it with hydrogen chloride in accordance with known methods. The product of the latter reaction is often referred to as rubber hydrochloride but it is embraced within the term "chlor rubber" as herein used. These chlor rubber and vinyl chloride resins are in general extremely tough and are desirable in this respect but are unfortunately comparatively expensive. The chlor viscoresins, on the other hand, are relatively inexpensive and are suitable for many operations but in certain uses lack the desired property of toughness. It is, therefore, apparent that a very desirable product can be made by mixing a chlor rubber or a vinyl chloride resin with a chlor viscoresin. The proper consistency can be obtained by the addition of plasticizers, for instance those previously mentioned.

As an example of a coating composition in accordance with this last phase of my invention, a mixture of 25% chlor rubber, 50% chlor viscoresin and 25% chlorinated diphenyls can be used in solution in an organic solvent as a coating composition.

One use for which my new compositions of matter are particularly suited is as paints for concrete. The production of satisfactory inexpensive concrete paints has always been a problem. The chlor viscoresins possess the desired resistance to washing and other chemical and physical attack. When compounded to the proper consistency they make very effective paints for concrete floors and the like. Mixtures of chlor viscoresin and plasticizing agent in accordance with my previous disclosure can be used in organic solvent solution. Chlor rubbers and/or vinyl chloride resins can be added to good effect.

Another outstanding use for these various coating compositions is for coating fabrics to be used under extremely wet conditions and particularly under acid or alkaline conditions.

The compositions in accordance with my invention are particularly suitable for use as coating compositions, as previously described. However, chlorinated viscoresins, plasticized and modified in accordance with my invention, are useful in inks, particularly as rotogravure inks, as adhesives, in molding compositions and for other uses.

This application is a continuation-in-part of the copending application of Maurice H. Arveson, Serial No. 67,092, filed March 4, 1936 and issued as U. S. Patent 2,213,331 on Sept. 3, 1940.

While I have described my invention in connection with certain specific embodiments thereof, it is to be understood that these are by way of illustration and not by way of limitation and the invention is limited only by the scope of the appended claims which should be construed as broadly as the prior art will permit.

I claim:

1. A composition of matter capable of forming a flexible, glossy, flame-resistant and waterproof coating comprising a mixture of a hard, brittle, highly chlorinated polymer of unsubstituted isobutylene normally insoluble in organic solvents, said chlorinated polymer containing between about 45% and about 65% chlorine, and compatible viscous chlorinated diphenyls as a plasticizing agent therefor, said chlorinated diphenyls containing at least 25% chlorine.

2. A composition of matter capable of forming a flexible, glossy, flame-resistant and waterproof coating comprising an organic solvent and a mixture of a hard, brittle, highly chlorinated polymer of unsubstituted isobutylene containing between about 45% and about 65% chlorine and normally insoluble in the said organic solvent and a chlorinated diphenyl plasticizing agent compatible with the said chlorinated polymer of isobutylene, said chlorinated diphenyl containing at least 25% chlorine, the mixture of the said chlorinated polymer of isobutylene and the chlorinated diphenyl plasticizing agent being dissolved in the said solvent.

3. A composition of matter capable of forming a flexible, glossy, tough, flame-resistant and waterproof coating comprising a mixture of about 50% chlorinated polymer of isobutylene said chlorinated polymer containing between about 45% and 65% chlorine, about 25% chlorinated diphenyls, and about 25% of chlor rubber as a toughening agent, said mixture being dissolved in an organic solvent.

MAURICE H. ARVESON.